United States Patent
Kale

(10) Patent No.: US 12,480,694 B2
(45) Date of Patent: Nov. 25, 2025

(54) CONNECTING AND DISCONNECTING A COOLING LOOP FROM A REFRIGERATION SYSTEM

(71) Applicant: Edwards Vacuum LLC, Sanborn, NY (US)

(72) Inventor: Kaustubh Kale, Chelmsford, MA (US)

(73) Assignee: Edwards Vacuum LLC, Sanborn, NY (US)

( * ) Notice: Subject to any disclaimer, the term of this patent is extended or adjusted under 35 U.S.C. 154(b) by 143 days.

(21) Appl. No.: 18/556,170

(22) PCT Filed: Apr. 21, 2022

(86) PCT No.: PCT/IB2022/053739
§ 371 (c)(1),
(2) Date: Oct. 19, 2023

(87) PCT Pub. No.: WO2022/224191
PCT Pub. Date: Oct. 27, 2022

(65) Prior Publication Data
US 2024/0183592 A1 Jun. 6, 2024

(30) Foreign Application Priority Data
Apr. 23, 2021 (GB) ..................... 2105816

(51) Int. Cl.
*F25B 41/24* (2021.01)
*F25B 45/00* (2006.01)
*F25B 49/02* (2006.01)

(52) U.S. Cl.
CPC .............. *F25B 41/24* (2021.01); *F25B 45/00* (2013.01); *F25B 49/02* (2013.01);
(Continued)

(58) Field of Classification Search
CPC .......... F25B 41/24; F25B 45/00; F25B 49/02; F25B 2345/003; F25B 2500/221; F25B 2600/2515; F25B 2700/19
See application file for complete search history.

(56) References Cited

U.S. PATENT DOCUMENTS

| | | | |
|---|---|---|---|
| 2005/0155373 A1* | 7/2005 | Hirooka | .................... F28D 7/04 62/62 |
| 2006/0075775 A1* | 4/2006 | Boiarski | ................. F25B 9/006 62/612 |

(Continued)

FOREIGN PATENT DOCUMENTS

| | | |
|---|---|---|
| GB | 2360573 A | 9/2001 |
| JP | H11190561 | 7/1999 |

(Continued)

OTHER PUBLICATIONS

Japanese Notification of Reason for Rejection dated Aug. 26, 24 for corresponding Japanese application Serial No. 2023-564108, 19 pages.

(Continued)

*Primary Examiner* — Jonathan Bradford
(74) *Attorney, Agent, or Firm* — Theodore M. Magee; Westman, Champlin & Koehler, P.A.

(57) ABSTRACT

A control system for controlling the flow of refrigerant includes: an inlet valve configured to selectively isolate or couple a supply path for supplying refrigerant from a refrigeration system with an inlet of a cooling loop; an outlet valve configured to selectively isolate or couple a return path for returning refrigerant to the refrigeration system with an outlet of the cooling loop; a refrigerant collection valve configured to selectively isolate or couple a refrigerant collection path for collecting refrigerant for the refrigeration system with the cooling loop; a pressure sensor for determining a pressure of refrigerant in the cooling loop; an input (Continued)

for receiving cooling loop disconnect and connect commands; and control circuitry configured to receive signals from the pressure sensor and the commands from the input and to generate control signals for controlling the opening and closing of the inlet, outlet and refrigerant collection valves in response thereto.

14 Claims, 4 Drawing Sheets

(52) U.S. Cl.
CPC ... *F25B 2345/003* (2013.01); *F25B 2500/221* (2013.01); *F25B 2600/2515* (2013.01); *F25B 2700/19* (2013.01)

(56) References Cited

U.S. PATENT DOCUMENTS

| | | |
|---|---|---|
| 2008/0289767 A1 | 11/2008 | Tandou et al. |
| 2010/0326094 A1 | 12/2010 | Tandou et al. |
| 2014/0283534 A1 | 9/2014 | Tandou et al. |

FOREIGN PATENT DOCUMENTS

| | | |
|---|---|---|
| JP | 2004116885 | 4/2004 |
| JP | 2005089864 A | 4/2005 |
| JP | 2020046081 | 3/2020 |
| JP | 2021018042 | 2/2021 |
| KR | 101109733 | 2/2012 |
| WO | 03036197 A1 | 5/2003 |
| WO | 2019035205 A1 | 2/2019 |

OTHER PUBLICATIONS

PCT Notification of Transmittal of the International Search Report and the Written Opinion of the International Searching Authority, or the Declaration, PCT International Search Report and PCT Written Opinion dated Jul. 19, 2022 for corresponding PCT application Serial No. PCT/IB2022/053739, 13 pages.
British Search Report dated Oct. 18, 2021 for corresponding British application Serial No. GB2105816.9, 1 page.

* cited by examiner

CONNECTING AND DISCONNECTING A COOLING LOOP FROM A REFRIGERATION SYSTEM

CROSS-REFERENCE TO RELATED APPLICATION

This application is a Section 371 National Stage Application of International Application No. PCT/IB2022/053739 filed Apr. 21, 2022, and published as WO 2022/224191 A1 on Oct. 27, 2022, the content of which is hereby incorporated by reference in its entirety and which claims priority of British Application No. 2105816.9, filed Apr. 23, 2021.

FIELD

The field of the invention relates to controlling refrigerant flow when connecting or disconnecting a cooling loop in a semiconductor processing chamber from a refrigeration system BACKGROUND With new and evolving requirements for cooling semiconductor wafers to ever lower temperatures, there is a push in the industry to cool the semiconductor wafer directly using refrigerants instead of using a secondary heat transfer fluid as the medium of heat transfer. Conventional heat transfer fluids are liquids, however, with the use of direct cooling, the refrigerants can be in the liquid, gaseous or mixed phase. While the refrigerants' ability to change phase is advantageous from a heat transfer perspective, it creates special challenges when the cooling apparatus (semiconductor chuck, cool plate etc.) needs to be connected or disconnected from the refrigeration system.

It is illegal and environmentally irresponsible to allow refrigerants to escape to the environment. Therefore, when the cooling apparatus is being disconnected from the refrigeration system, care must be taken that no refrigerant is released to the atmosphere. In order to achieve this, one must follow a complex process that ensures that substantially all the refrigerant in the cooling apparatus and connecting piping is evacuated before the cooling apparatus is disconnected.

Conversely, when a cooling apparatus is being installed or connected, the system should be leak tested before semiconductor wafer processing can begin. The processes required to ensure zero or near zero refrigerant leakage are complex and labour intensive.

A semiconductor processing chamber is generally within a clean room and remote from the refrigeration system which may be in the sub fab. This makes the connection and disconnection more complex. Furthermore, such systems may require the refrigeration system to be disconnected from the cooling loop more regularly than in conventional systems making it more important that the connection/disconnection process is both efficient, reliable and repeatable.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides a control system for controlling the flow of refrigerant between a refrigeration system and a cooling loop within a semiconductor processing chamber such that leakage of refrigerant is inhibited when connecting or disconnecting said refrigeration system from said cooling loop, said control system comprising: an inlet valve configured to selectively isolate or couple a supply path for supplying refrigerant from said refrigeration system with an inlet of said cooling loop; an outlet valve configured to selectively isolate or couple a return path for returning refrigerant to said refrigeration system with an outlet of said cooling loop; a refrigerant collection valve configured to selectively isolate or couple a refrigerant collection path for collecting refrigerant for said refrigeration system with said cooling loop; a pressure sensor for determining a pressure of refrigerant in said cooling loop; an input for receiving cooling loop disconnect and connect commands; and control circuitry configured to receive signals from said pressure sensor and said commands from said input and to generate control signals for controlling the opening and closing of said inlet, outlet and refrigerant collection valves in response thereto.

The inventor of the present invention recognised the problems associated with connecting and disconnecting directly cooled cooling loops from a refrigeration system and in particular, the problem associated with potential leakage of refrigerant into the environment with such a process. Furthermore, where loops are connected and disconnected regularly then it is important that the process can be performed not only with minimal leakage but also in a way that is both repeatable, reliable and efficient.

One way to ensure reliability and repeatability and indeed to improve efficiency is to automate such a process. The inventor therefore sought to provide a refrigeration system with control circuitry and automatically controlled valves, such that the connection and disconnection process could be automatically controlled with an inbuilt system that requires minimal manual intervention and no separate refrigeration recovery unit.

Such a system allows the flow of the refrigerant to or from the cooling loop to be controlled and a pressure sensor enables the status of the cooling loop to be monitored and control circuitry can automatically respond to readings from the pressure sensors to control the refrigerant flow and the connection and isolation of different portions of the system.

The valves can be controlled to isolate or couple the cooling loop with or from the refrigeration system at the appropriate time and a pump is used to move the refrigerant. In this way a system is provided that has automatically controlled components which allow the flow and isolation of refrigerant to be controlled with minimal manual intervention in a reliable and repeatable manner. Thus, the system can automatically place the refrigeration system and cooling loop in a suitable condition to allow connection or disconnection of the loop in a safe and leak free manner.

In some embodiments, said control circuitry is configured in response to receipt of a cooling loop disconnect command to: control a compressor in said refrigeration system to turn off; control said inlet valve and said outlet valve such that they are closed; control said refrigerant collection valve to be open; activate a pump to pump refrigerant from said cooling loop towards said refrigeration system along said refrigerant collection path; determine from said pressure sensor a pressure in said cooling loop and in response to said pressure falling below a predetermined evacuated value: control said pump to turn off; control said refrigerant collection valve to close; and after a predetermined time determine whether said pressure in said cooling loop is increasing by more than a predetermined amount and if not generate an indication that said cooling loop may be safely disconnected from said refrigeration system.

When a disconnect command is received, the control circuitry stops the refrigeration process by turning the compressor off and then ensures that the inlet and outlet valves which connect the refrigerant supply and return path to the cooling loop are closed. The control circuitry then controls the refrigerant collection valve to be open and this provides a fluid flow path from the cooling loop towards the refrigeration system. A pump for pumping fluid from the cooling loop along this path is then activated and the pressure in the cooling loop monitored. When the pressure has fallen to a low value indicating little or no refrigerant left in the cooling loop, the pump is turned off and the refrigerant collection valve is closed, these two steps may occur simultaneously or in either order. After a certain time it is determined if the pressure in the cooling loop is changing by more than a certain amount, this may be by measuring a rate of change of pressure at this time, or by monitoring an actual value. If it is determined that the pressure is not increasing unduly then this is indicative that the system is leak-tight and an indication is provided to the user that the cooling loop may be safely disconnected from the system.

In some embodiments, said pump comprises said compressor.

A pump is required for the control system to be able to control the movement of refrigerant from the cooling loop prior to disconnection. There is already a pump in the form of a compressor within the refrigeration system and in some embodiments this compressor may be used under the control of the control circuitry to pump refrigerant from the cooling loop.

Alternatively, the control system may comprise a dedicated pump, said pump being configured to pump refrigerant from said cooling loop along said refrigerant collection path.

An alternative may be to have a dedicated pump within the control system and this may have an advantage of the pump being of a size and capacity specially adapted for evacuation of the cooling loop which allows the process to be performed efficiently. This may be particularly useful if the compressor in the refrigeration system is too large for this operation or is unsuitable because of suction pressure limits or in cases where there are multiple compressors in the refrigeration system.

In some embodiments, said control system further comprises a buffer volume on said refrigerant collection path and a further valve configured to selectively isolate or couple said refrigerant collection path with said compressor, said control circuitry being configured to control said further valve to be closed prior to activating said pump, such that on activation said pump pumps said refrigerant from said cooling loop into said buffer volume.

Where there is a dedicated pump on the refrigerant collection path then in some cases a buffer volume on this path may be provided for collecting the refrigerant evacuated from the cooling loop. In this case there may be additional valves for isolating the refrigerant collection path from the refrigeration system when evacuating the cooling loop such that the buffer volume collects the refrigerant. This allows the dedicated pump to be isolated from the compressor and from the higher pressure side of the refrigeration system during this process.

In some embodiments, said control system further comprises a return path valve configured to selectively isolate or couple said return path with said compressor, said control circuitry being configured to control said return path valve to be closed when controlling said inlet valve and said outlet valve to be closed.

In some embodiments there is provided a valve for isolating the return path from the compressor during evacuation of the controlling loop to inhibit refrigerant from flowing in a reverse direction down this path when it is being pumped from the cooling loop.

In some embodiments, said control system further comprises a bypass valve configured to selectively isolate or couple a warmer refrigerant bypass path for supplying warmer refrigerant from said compressor, said control circuitry being configured to control said bypass valve to be closed when controlling, said inlet valve and said outlet valve to be closed.

In some embodiments, there will be a bypass path for supplying warmed refrigerant to the refrigerant supply path. In some embodiments, it may be convenient for there to be separate valves for isolating the refrigerant supply path and the bypass path from the cooling loop. In this regard, the two paths transport fluids that are at significantly different temperatures and thus, having separate valves on the two paths allows these valves to be configured for the operational temperatures of the path they are situated on. Were a single valve to be used downstream of the junction between the two paths, then it would see greater temperature fluctuations and may degrade more quickly and/or require more expensive components. Thus, in some embodiments two separate valves are provided and they are individually controlled by the control system as they are both sources of refrigerant to the cooling loop.

In some embodiments, said control system comprises a trace gas source and a trace gas valve configured to selectively isolate or couple said trace gas source with said cooling loop, said control circuitry being configured to control said trace gas valve.

In order to be able to leak test the cooling loop without risking loss of refrigerant a trace gas source and a trace gas valve may be provided such that they can be selectively coupled to the cooling loop and the cooling loop may be filled with trace gas to a predetermined pressure allowing any leakage to be determined. The trace gas may comprise an inert gas such as dry nitrogen, high pressure helium or some other gas such as R134A.

In some embodiments, said control system comprises an exhaust valve to selectively isolate or couple said cooling loop with a pump, said control circuitry being configured to control said exhaust valve.

The control system may also comprise an exhaust valve and a connection to a pump for evacuating the cooling loop. This may be advantageous where the cooling loop is to be evacuated of a fluid that should not be sent to the refrigeration system, such as when the cooling loop is full of trace gas.

In some embodiments, said control system is configured in response to receipt of a cooling loop connect command to: control said inlet valve, outlet valve, refrigerant collection valve and exhaust valve such that they are closed; control said trace gas valve to open such that trace gas from said trace gas source flows into said cooling loop; determine a pressure in said cooling loop and in response to said pressure rising to or above a predetermined leak test value:
   control said trace gas valve to close; after a predetermined time determine whether said pressure in said cooling loop is decreasing by more than a predetermined leak test amount and if not: control said exhaust valve to open such that trace gas from said cooling loop is evacuated; determine a pressure in said cooling loop and in response to said pressure falling to or below a predetermined exhaust value: control said exhaust valve to close; determine a pressure in said cooling loop and in response to said pressure increasing by less than a predetermined leakage amount indicating that said cooling loop is correctly connected to said refrigeration system.

In addition to controlling the disconnection of the cooling loop from the system with minimal refrigerant leakage, embodiments may also control the connection allowing the connection to be made in a leak tight manner.

In order to do this a trace gas source may be provided along with an automatically controllable valve that allows the cooling loop when connected to the refrigeration system to be filled with trace gas to a predetermined pressure and any pressure leaks to be detected by the pressure sensor. Once it is determined that the cooling loop is connected in a sufficiently leak tight manner then an exhaust valve may be opened and the trace gas evacuated. As this point an indicator may be provided to the operator that the connection is leak tight and the refrigeration system may be started.

In some embodiments, said control system is configured in response to said indication that said cooling loop is correctly connected to said refrigeration system to open said further valve and after a predetermined time to close said further valve prior to starting said refrigeration system.

Where the control system is one with a separate pump and buffer volume then prior to restarting the refrigeration system the further valve that is located between the buffer volume and the compressor should be opened such that the refrigerant that is collected from the cooling loop can be returned to the refrigeration system, and then closed to isolate this path from the compressor.

In some embodiments, said control system is configured in response to an indication to start said refrigeration system to:
control said refrigerant collection valve, trace gas valve and exhaust valve to be closed; and
control said inlet valve and said outlet valve to open; and to activate said compressor.

Once the system is deemed to be correctly connected and where there is a buffer volume once the stored refrigerant has been returned to the refrigeration system, then the refrigeration system may start. In order for it to start it should be ensured that the refrigerant collection, trace gas valve and exhaust valves are closed and then the inlet valve and outlet valve should be opened and the compressor activated.

A second aspect provides a refrigeration system for supplying refrigerant to a cooling loop in a semiconductor processing chamber, said refrigeration system comprising:
a compressor;
a refrigerant supply path for supplying refrigerant from said compressor to said cooling loop;
a refrigerant return path for receiving refrigerant from said cooling loop and returning said refrigerant to said compressor;
at least one heat exchanger for exchanging heat between said refrigerant supply and return path; and
a control system according to a first aspect.

A third aspect provides a method of controlling the flow of refrigerant between a refrigeration system and a cooling loop within a semiconductor processing chamber such that leakage of refrigerant is inhibited when disconnecting said refrigeration system from said cooling loop, said method comprising:
controlling a compressor in said refrigeration system to turn off;
controlling an inlet valve on a refrigerant supply path and an outlet valve on a refrigerant return path such that they are closed;
controlling a refrigerant collection valve on a refrigerant collection path to be open;
activating a pump to pump refrigerant from said cooling loop towards said refrigeration system along said refrigerant collection path;
determining a pressure in said cooling loop and in response to said pressure falling below a predetermined evacuated value:
controlling said pump to turn off;
controlling said refrigerant collection valve to close; and
after a predetermined time determining whether said pressure in said cooling loop is increasing by more than a predetermined amount and if not generating an indication that said cooling loop may be safely disconnected from said refrigeration system.

A fourth aspect provides a method of controlling the flow of refrigerant between a refrigeration system and a cooling loop within a semiconductor processing chamber such that leakage of refrigerant is inhibited when connecting said refrigeration system to said cooling loop, said method comprising:
controlling an inlet valve, outlet valve, refrigerant collection valve and exhaust valve such that they are closed;
controlling a trace gas valve to open such that trace gas from a trace gas source flows into said cooling loop;
determining a pressure in said cooling loop and in response to said pressure rising to or above a predetermined leak test value:
controlling said trace gas valve to close;
after a predetermined time determining whether said pressure in said cooling loop is decreasing by more than a predetermined leak test amount and if not:
controlling said exhaust valve to open such that trace gas from said cooling loop is evacuated;
determining a pressure in said cooling loop and in response to said pressure falling to or below a predetermined exhaust value:
controlling said exhaust valve to close;
determining a pressure in said cooling loop and in response to said pressure increasing by less than a predetermined leakage amount:
generating an indication that said cooling loop is correctly connected to said refrigeration system.

A fifth aspect provides a computer program which when executed by a processor is configured to control said processor to perform a method according to a third or fourth aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided.

Embodiments provide means to evacuate the cooling apparatus or loop and connected piping so that the cooling apparatus can be disconnected from the refrigeration system without leak of refrigerant. Embodiments also provide a way to leak check the connections and piping of the cooling apparatus on reconnection or initial connection of the cooling apparatus to the refrigeration system.

The valves described below can be standard or custom valves of any type—solenoid, pneumatic, servo motor controlled, proportional control valves etc. Instead of using several valves as described below, valve manifolds with several flow path configurations can also be used. Manifolds help reduce the number of individual valves required. Valves can be NO (normally open), NC (normally closed) type. The valves are automatically controlled by control circuitry to open or close.

The pressure sensing apparatus can be a vacuum gauge, electronic pressure measurement apparatus (pressure transducer, diode etc.). These can be standard or custom type.

The logic of the operation is controlled and driven by a controller. The controller can be standard or custom including but not limited to PID, PLC, Microcontroller type.

Figure 1:
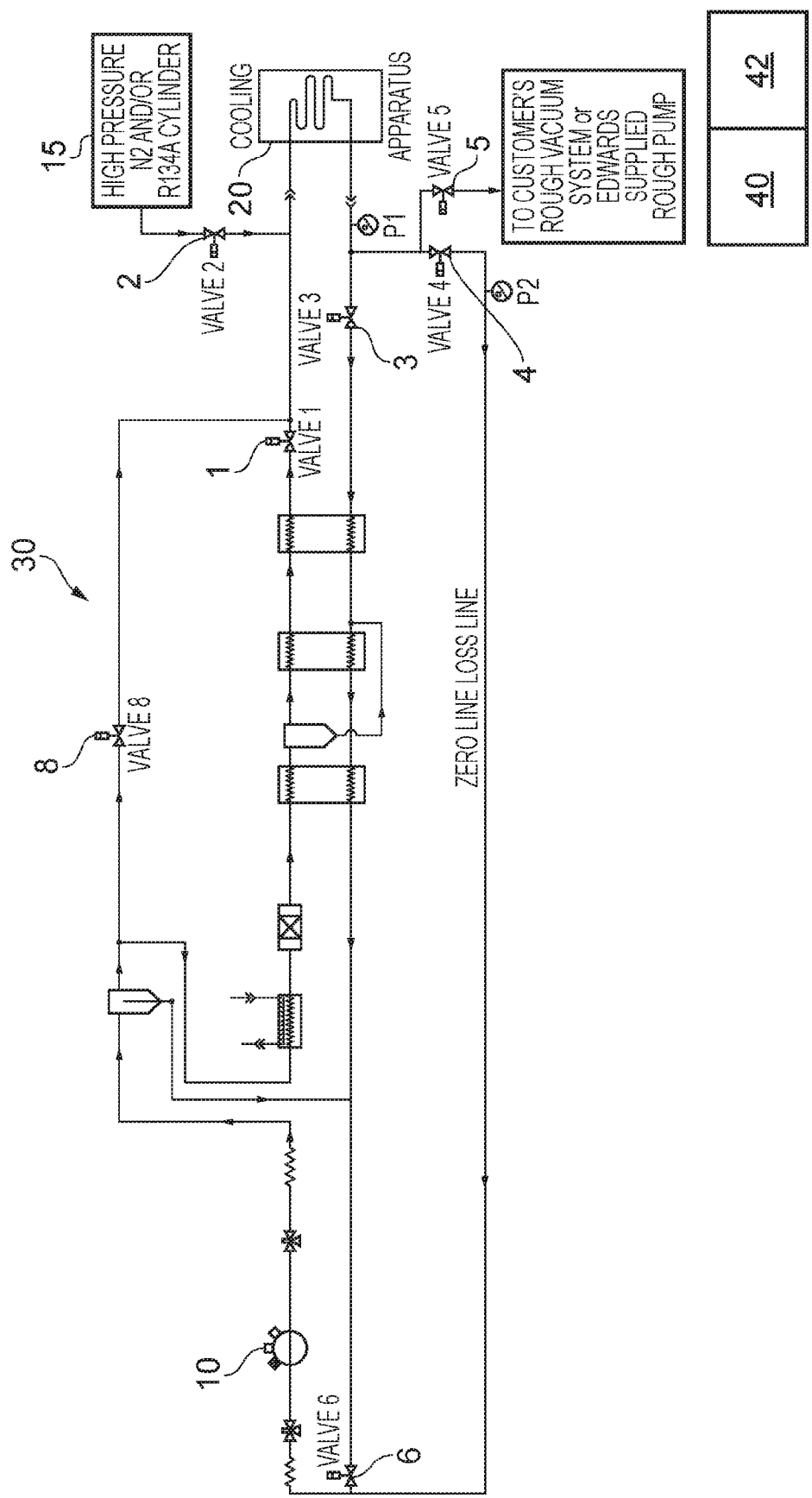
FIG. 1 shows a refrigeration system according to a first embodiment.

FIG. 1 shows a refrigeration system 30 with an automatic control system according to an embodiment. The refrigeration system is connected to a cooling loop 20 which may be within a semiconductor processing apparatus and be used to cool a chuck supporting a wafer for example. The refrigerant is supplied directly from the refrigeration system 30 to the cooling loop 20 and thus, when the refrigeration system 30 needs to be disconnected from the cooling loop 20 care must be taken to inhibit any leakage of refrigerant. An automatic control system is provided to help in this process. The automatic control system comprises automatically controlled valves which in this embodiment include a supply path valve 1, a return path valve 3 and a further valve 6 at the compressor end of the return path for isolating the return path from compressor 10. In this embodiment there is also a bypass line for supplying warmer refrigerant to the supply path and this comprises an automatically controlled valve 8. There is also a trace gas source 15 for supplying trace gas to the cooling loop 20 during a leak test on connection of the cooling loop to the apparatus and the connection or isolation of this source is controlled by a valve 2.

There is a refrigerant collection line or a zero line loss line which allows refrigerant to be collected from the cooling loop prior to disconnection and this has a valve 4 associated with it which either connects this line to the cooling loop or isolates it from it. There is also a further valve 5 which connects the cooling loop through an exhaust pump and allows trace gas to be evacuated from the cooling loop once the leak test is completed. There is a pressure gauge P2 on this line that can be used to detect if valve 4 is leaking, or is not closed when the zero line loss line should be isolated from the cooling loop.

There is also a pressure sensor P1 for sensing the pressure of the gas within the control loop and this can be used to determine if it has been successfully evacuated and also during a leak test. The process of preparing for connection and disconnection are controlled by control circuitry 40 which includes a user input 42 and a user output such as a user display not shown. The user input allows the user to trigger the connection or disconnection process. The output allows the user to receive an indication when the process has successfully completed and connection or disconnection can be performed.

In addition to the components described in detail above, these components being the ones relevant for the control system, there are also other components of the refrigeration system, that are dependent upon the type of refrigeration system and may include heat exchangers between the return and supply paths.

The refrigeration system 30 can be of any type including but not limited to systems running on the Vapor Compression Cycle (Joule Thompson), GM Cycle, Stirling cycle. The cooling apparatus or loop 20 is directly connected to the refrigeration system 30 such that the conditioned refrigerant/s are directly circulating inside the cooling apparatus. In such an arrangement, the cooling apparatus along with the refrigeration system form a closed, leak proof system. The cooling apparatus may need to be disconnected from the refrigeration system for multiple reasons such as periodic maintenance, installing a different cooling apparatus etc. In this event it is vital that substantially all the refrigerant inside the cooling apparatus and associated piping be evacuated. The following steps describe one embodiment of how this can be done (with reference to FIG. 1):

1. Turn OFF the compressor
2. Close valves 8, 1, 3, 6
3. Confirm that valves 2 and 5 are closed
4. Open valve 4
5. Turn on the compressor. This will cause the refrigerant inside the cooling apparatus and piping to be evacuated and moved to the high pressure side of the compressor.
6. Once the pressure at P1 reaches a pre-determined value, turn OFF the compressor
7. Close valve 4
8. Wait for a predetermined time to check if the pressure at P1 is rising
9. If the pressure at P1 does not rise above a predetermined value and/or rate of pressure rise is not faster than a predetermined rate. The cooling apparatus can now be disconnected from the refrigeration system If the compressor used above is of very high capacity we can use methods such as cylinder unloading, VFD (variable frequency drive) control etc. to meter its pumping capacity as required.

When reconnecting the cooling apparatus to the refrigeration system:

1. Make sure valves 1, 2, 3, 4, 5, 6, 8 are closed
2. Connect the cooling apparatus to the refrigerant piping
3. Open valve 2 to introduce HP trace gas into the cooling apparatus and piping. Pressurize the cooling apparatus to a predetermined pressure
4. Close valve 2. For a predetermined time interval check P1 for pressure drop and rate of pressure drop.

5. If the pressure drop and/or rate of pressure drop is lower than a predetermined value, open valve 5
6. Evacuate the cooling apparatus and associated piping volume till P1 reads the predetermined required vacuum level
7. Close valve 5
8. For a predetermined time interval check P1 for pressure rise and rate of pressure rise
9. If the pressure rise and/or rate of pressure rise is within predetermined limits the process is now complete The refrigeration system can now be turned ON and refrigerant/s can be introduced safely in the cooling apparatus.

Figure 2:
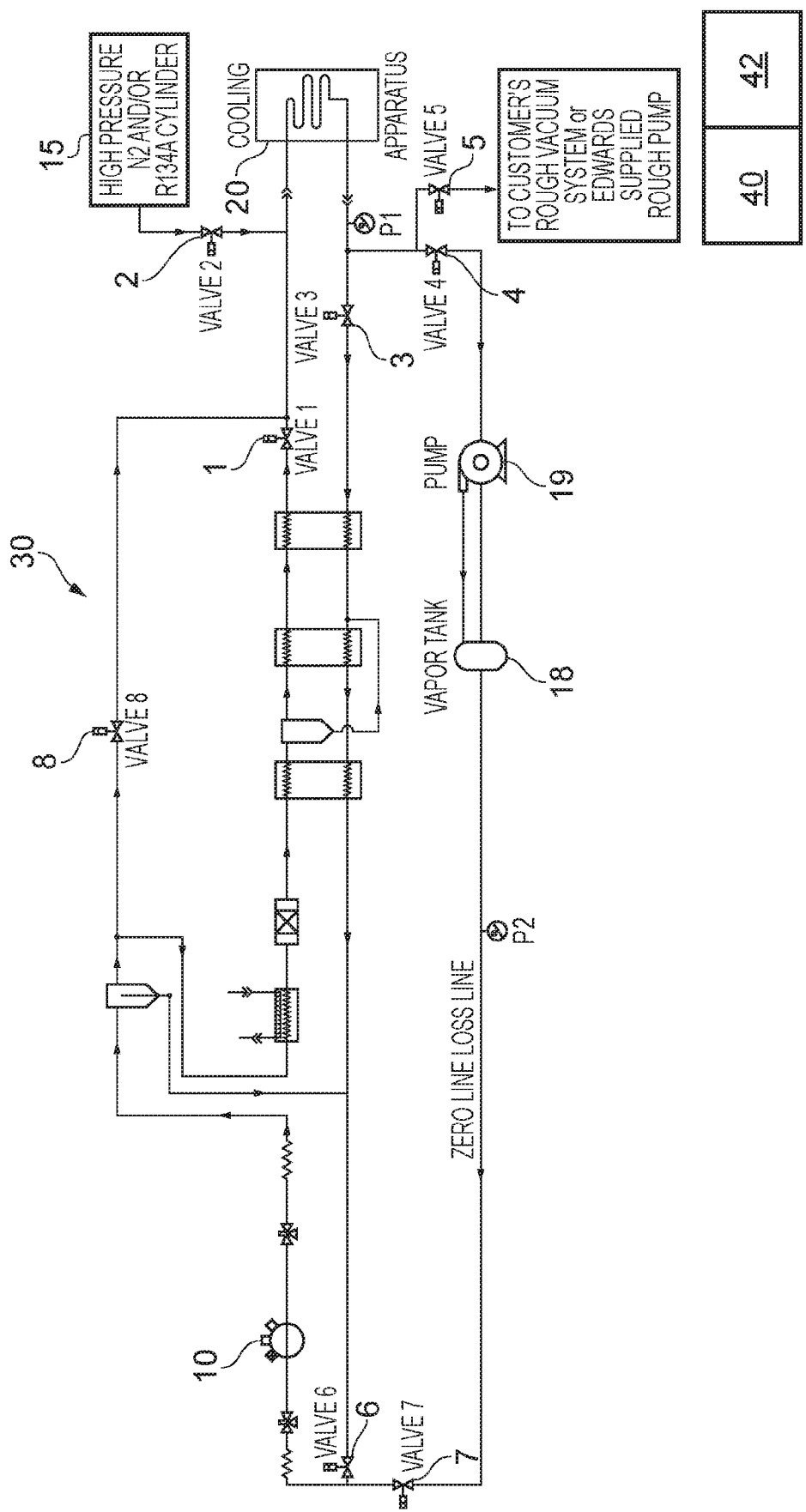
FIG. 2 shows a refrigeration system according to a second embodiment.

FIG. 2 shows an alternative embodiment where there is an additional pump 18 and a buffer tank 19 on the zero line loss line or refrigerant collection path. There is also a further valve 7 at the end of the zero line loss line which acts to isolate it from the compressor and from the return line. There is also a pressure sensor P2 for sensing pressure in the zero line loss line.

In this alternative embodiment, a dedicated pump 18 is used to evacuate the cooling loop prior to disconnection of the cooling loop and the refrigerant is collected in tank 19. This is useful if the compressor on the system is too large for this operation or unsuitable because of suction pressure limits or if there are multiple compressors on the system. On reconnection valve 7 is open to allow the collected refrigerant to return to the refrigeration system and then is closed prior to starting the refrigeration system. As for the embodiment of FIG. 1, the process of preparing for connection and disconnection are controlled by control circuitry 40 which includes a user input 42 and a user display not shown. The user input allows the user to trigger the connection or disconnection process. The display allows the user to receive an indication when the process has successfully completed and connection or disconnection can be performed.

In this embodiment, the sequence of operation to disconnect the cooling apparatus is as follows (with reference to FIG. 2):
1. Turn OFF the compressor
2. Close valves 8, 1, 3, 6
3. Confirm that valves 2 and 5 are closed
4. Open valve 4
5. Turn ON the vacuum pump and evacuate the refrigerant in the cooling apparatus and associated piping into the vapor tank and associated piping
6. Turn OFF vacuum pump when the pressure of the cooling apparatus reaches a predetermined vacuum level as indicated by pressure gauge P1
7. Close valve 4 and wait for a predetermined amount of time to check if the pressure at P1 rises
8. If the pressure at P1 does not rise above a predetermined value and/or rate of pressure rise is not faster than a predetermined rate. The cooling apparatus can now be disconnected from the refrigeration system When reconnecting the cooling apparatus to the refrigeration system:
1. Make sure valves 1, 2, 3, 4, 5, 6, 7, 8 are closed
2. Connect the cooling apparatus to the refrigerant piping
3. Open valve 2 to introduce HP trace gas into the cooling apparatus and piping. Pressurize the cooling apparatus to a predetermined pressure
4. Close valve 2. For a predetermined time interval check P1 for pressure drop and rate of pressure drop.
5. If the pressure drop and/or rate of pressure drop is lower than a predetermined value, open valve 5
6. Evacuate the cooling apparatus and associated piping volume till P1 reads the predetermined required vacuum level
7. Close valve 5
8. For a predetermined time interval check P1 for pressure rise and rate of pressure rise
9. If the pressure rise and/or rate of pressure rise is within predetermined range, start the refrigeration system in standby mode.
10. Open valve 7. Once the pressure value at P2 reaches a predetermined value, close valve 7. The reconnection process is now complete The above are only two of many possible configurations and sequence of operations for this service automation. The final engineered solution can have multiple configurations and may have other devices such as more components and valves (check valves, pressure relief valves, manual ON/OFF valves etc.) to ensure proper operation, reliability and redundancy for safety.

Figure 3:
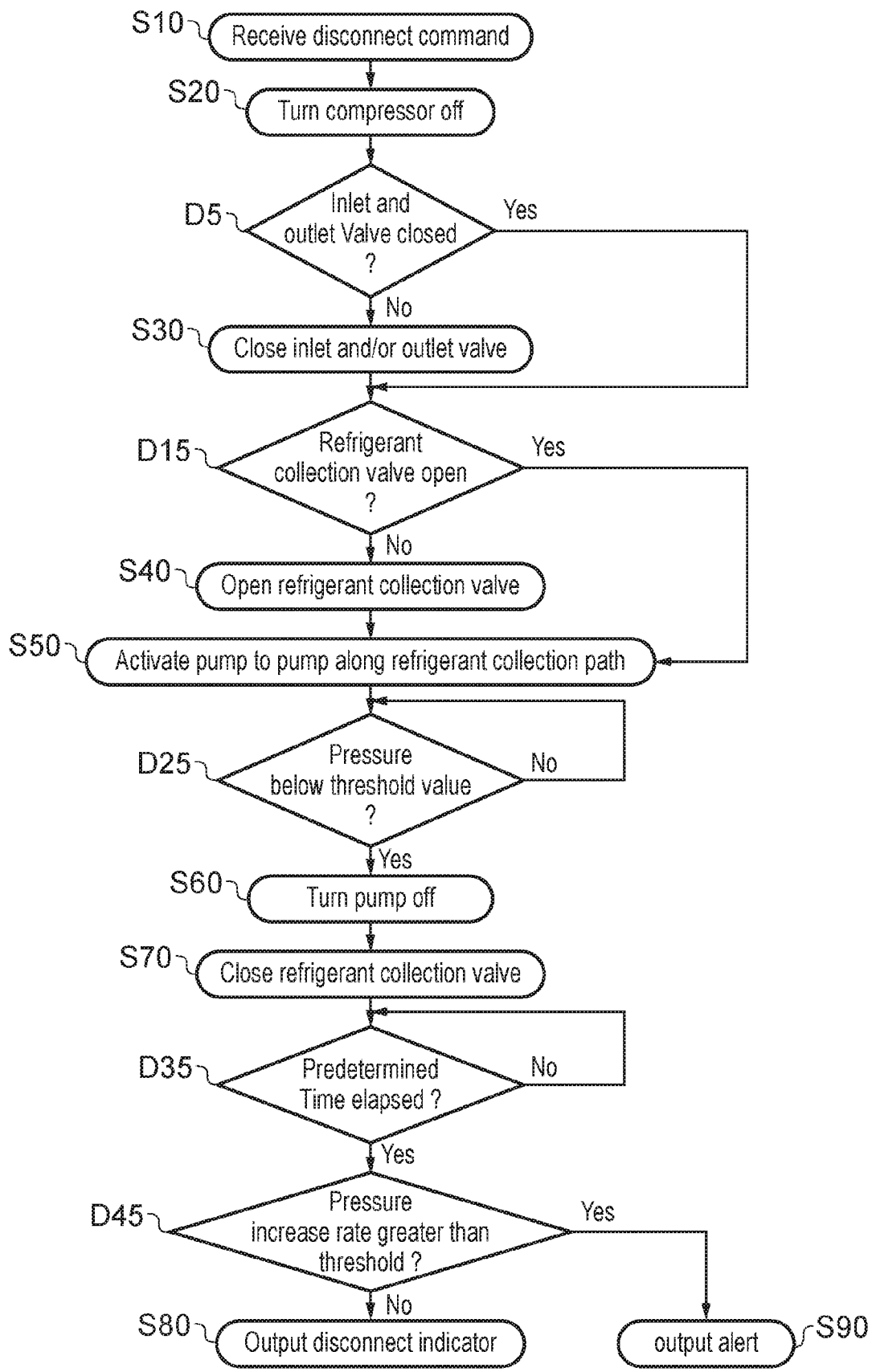
FIG. 3 schematically shows a flow diagram illustrating steps in a method for safety disconnecting the cooling loop.

FIG. 3 shows steps in a method for disconnecting the cooling loop and the refrigeration system according to an embodiment. In response to a user input disconnect command at step S10 control circuitry turns the compressor 10 off at step S20. It then determines at step D5 whether the inlet and outlet valve are closed and if they are not then at step S30 the control circuitry sends a signal to close the valves. Once they are closed it is determined at step D15 whether the refrigerant valve is open and if it is determined that it is not then the control circuitry sends a command at step S40 to open the refrigerant valve.

The control circuitry then at step S50 activates the pump to pump the refrigerant along the refrigerant collection path, the pump may be the compressor of the refrigeration system as in the embodiment of FIG. 1 or it may be a dedicated pump on the refrigerant collection line as in the embodiment of FIG. 2.

The pressure sensor P1 then determines at step D25 the pressure in the cooling loop and if it is below a threshold value then control circuitry controls the pump to turn off at step S60. The control circuitry then controls the refrigerant collection valve to close at step S70 and then at step D35 it is determined when a predetermined time has elapsed and when it has the pressure increase in the evacuated cooling loop is determined. If the pressure in the cooling loop is increasing at a greater rate than a predetermined set value, this signifies that there is a leak and an alert is provided to the user. If the pressure increase is not too high, then the system has been effectively isolated from the refrigeration system and an indicator is output at step S80 to indicate that the cooling loop can be safely disconnected from the refrigeration system.

Figure 4:
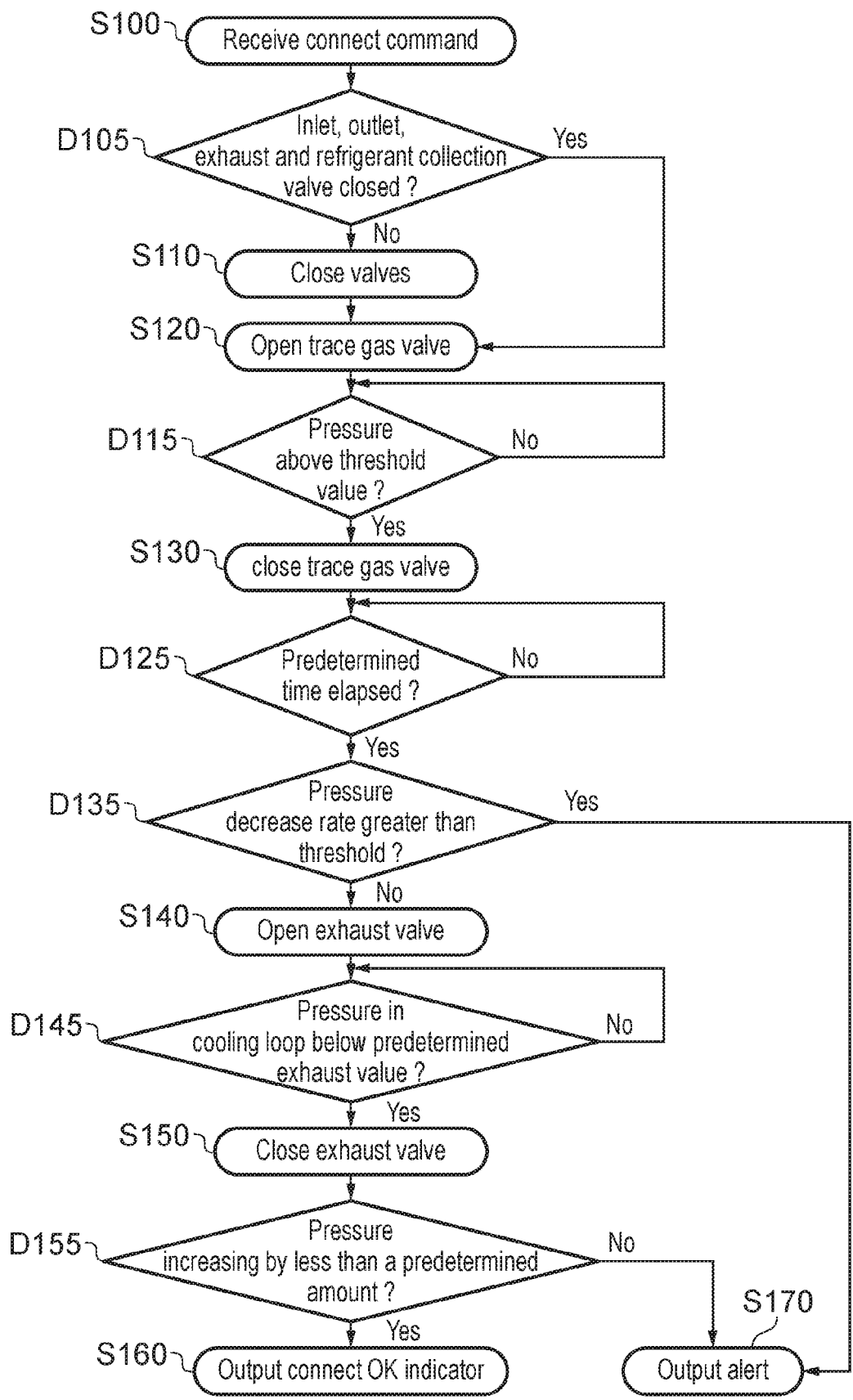
FIG. 4 schematically shows steps in a method for connecting a cooling loop.

FIG. 4 shows a method for connecting a cooling loop according to an embodiment. A connect command is received at step S100 from a user at the user input 42 and in response to this at step D105 it is determined whether the inlet, outlet, exhaust, and refrigerant collection valves are closed. If they are not then at step S110 any of them that were determined to be open are closed. Once they are all closed at step S120 the trace gas valve is opened such that the trace gas source is connected to the cooling loop. At step D115 the pressure in the cooling loop is determined by pressure sensor P1 and when it is above a predetermined value then at step S130 the trace gas valve is closed isolating the trace gas source from the cooling loop. Once it is determined that a predetermined time has elapsed at step D125 then it is determined whether there is a decrease in the cooling loop pressure that is greater than a threshold at step D135. If the pressure decrease rate is greater than the threshold then this indicates that there is a leak and an alert it output at step S170. If there is not a pressure decrease rate above the threshold then at step S140 the exhaust valve can be opened to exhaust the trace gas from the cooling loop using the exhaust pump. Then at step D145 it is determined if the pressure in the cooling loop is below the predetermined exhaust value and when it is at step S150 the exhaust valve is closed. Then at step D155 it is determined whether the pressure in the cooling loop is not increasing unduly which would indicate a leak, if it is not then at step S160 an indicator can be output indicating that connection has been correctly done and the refrigeration system can be started. If the pressure is found to be increasing by more than a predetermined amount then an alert is output at step S170 indicating that there is a leak in the system.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A control system for controlling the flow of refrigerant between a refrigeration system and a cooling loop within a semiconductor processing chamber such that leakage of refrigerant is inhibited when connecting or disconnecting said refrigeration system from said cooling loop, said control system comprising:
    an inlet valve configured to selectively isolate or couple a supply path for supplying refrigerant from said refrigeration system with an inlet of said cooling loop;
    an outlet valve configured to selectively isolate or couple a return path for returning refrigerant to said refrigeration system with an outlet of said cooling loop;
    a compressor that compresses refrigerant provided to the supply path;
    a refrigerant collection valve configured to selectively isolate or couple a refrigerant collection path to said cooling loop, the collection path providing a path from said cooling loop to said compressor;
    a pressure sensor for determining a pressure of refrigerant in said cooling loop;
    an input for receiving cooling loop disconnect and connect commands; and
    control circuitry configured to receive signals from said pressure sensor and said commands from said input and to generate control signals for controlling the opening and closing of said inlet, outlet and refrigerant collection valves in response thereto, wherein said control circuitry is configured in response to receipt of said cooling loop disconnect command to:
    control said inlet valve and said outlet valve such that they are closed;
    control said refrigerant collection valve to be open; and
    direct the refrigerant from the cooling loop, through the collection valve and into the collection path while the inlet valve and the outlet valve are closed and the collection valve is open.

2. The control system according to claim 1, wherein said control circuitry is further configured in response to receipt of said cooling loop disconnect command to:
    after a predetermined time determine whether a pressure in said cooling loop is increasing by more than a predetermined amount and if not generate an indication that said cooling loop may be safely disconnected from said refrigeration system.

3. The control system according to claim 2, wherein the control circuitry stores the refrigerant in the collection path by running said compressor while said collection valve is open.

4. The control system according to claim 2, further comprising a pump, said pump being configured to pump refrigerant from said cooling loop along said refrigerant collection path wherein the control circuitry stores the refrigerant in the collection path by running said pump.

5. The control system according to claim 4, said collection path comprises a buffer volume and the control system further comprises a further valve configured to selectively isolate or couple said refrigerant collection path with said compressor, said control circuitry being configured to control said further valve to be closed prior to activating said pump, such that on activation said pump pumps said refrigerant from said cooling loop into said buffer volume.

6. The control system according to claim 1, said control system further comprising a return path valve configured to selectively isolate or couple said return path with said compressor, said control circuitry being configured to control said return path valve to be closed when controlling said inlet valve and said outlet valve to be closed.

7. The control system according to claim 1, said control system further comprising a bypass valve configured to selectively isolate or couple a warmer refrigerant bypass path for supplying warmer refrigerant from said compressor, said control circuitry being configured to control said bypass valve to be closed when controlling, said inlet valve and said outlet valve to be closed.

8. The control system according to claim 1, said control system comprising a trace gas source and a trace gas valve configured to selectively isolate or couple said trace gas source with said cooling loop, said control circuitry being configured to control said trace gas valve.

9. The control system according to claim 1, said control system comprising an exhaust valve to selectively isolate or couple said cooling loop with a pump, said control circuitry being configured to control said exhaust valve.

10. The control system according to claim 8 further comprising:
    an exhaust valve to selectively isolate or couple said cooling loop with a pump, said
        control circuitry being configured to control said exhaust valve, wherein said control system is configured in response to receipt of a cooling loop connect command to:
    control said inlet valve, outlet valve, refrigerant collection valve and exhaust valve such that they are closed;
    control said trace gas valve to open such that trace gas from said trace gas source flows into said cooling loop;
    determine a pressure in said cooling loop and in response to said pressure rising to or above a predetermined leak test value:
    control said trace gas valve to close;

after a predetermined time, determine whether said pressure in said cooling loop is decreasing by more than a predetermined leak test amount and if not:

control said exhaust valve to open such that trace gas from said cooling loop is evacuated;

determine a pressure in said cooling loop and in response to said pressure falling to or below a predetermined exhaust value:

control said exhaust valve to close;

determine a pressure in said cooling loop and in response to said pressure increasing by less than a predetermined leakage amount indicating that said cooling loop is correctly connected to said refrigeration system.

11. The control system according to claim 10, further comprising a buffer volume on said refrigerant collection path and a further valve configured to selectively isolate or couple said refrigerant collection path with said compressor, said control circuitry being configured to control said further valve to be closed prior to activating said pump, such that on activation said pump pumps said refrigerant from said cooling loop into said buffer volume, said control system being configured in response to said indication that said cooling loop is correctly connected to said refrigeration system to open said further valve and after a predetermined time to close said further valve prior to starting said refrigeration system.

12. The control system according to claim 10, said control system being configured in response to an indication to start said refrigeration system to:

control said refrigerant collection valve, trace gas valve and exhaust valve to be closed;

control said inlet valve and said outlet valve to open; and to activate said compressor.

13. A refrigeration system for supplying refrigerant to a cooling loop in a semiconductor processing chamber, said refrigeration system comprising:

the compressor;

the supply path for supplying refrigerant from said compressor to said cooling loop;

a return path for receiving refrigerant from said cooling loop and returning said refrigerant to said compressor;

at least one heat exchanger for exchanging heat between said supply path and return path; and a control system according to claim 1.

14. A method of controlling a flow of refrigerant between a refrigeration system and a cooling loop within a semiconductor processing chamber such that leakage of refrigerant is inhibited when disconnecting said refrigeration system from said cooling loop, said method comprising:

controlling a compressor in said refrigeration system to turn off;

controlling an inlet valve on a refrigerant supply path and an outlet valve on a refrigerant return path such that they are closed;

controlling a refrigerant collection valve on a refrigerant collection path to be open, the refrigerant collection path providing a path from said cooling loop to said compressor;

activating a pump to pump refrigerant from said cooling loop through said refrigerant collection valve and then along said refrigerant collection path;

determining a pressure in said cooling loop and in response to said pressure falling below a predetermined evacuated value:

controlling said pump to turn off;

controlling said refrigerant collection valve to close; and after a predetermined time determining whether said pressure in said cooling loop is increasing by more than a predetermined amount and if not generating an indication that said cooling loop may be safely disconnected from said refrigeration system.

* * * * *